(12) United States Patent
Xie et al.

(10) Patent No.: US 7,423,227 B2
(45) Date of Patent: Sep. 9, 2008

(54) APPARATUS FOR OPTICAL NAVIGATION

(75) Inventors: Tong Xie, San Jose, CA (US); Michael Brosnan, Fremont, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 404 days.

(21) Appl. No.: 10/655,946

(22) Filed: Sep. 4, 2003

(65) Prior Publication Data

US 2005/0051711 A1    Mar. 10, 2005

(51) Int. Cl.
G06K 11/06 (2006.01)
G06F 3/033 (2006.01)

(52) U.S. Cl. .................................. 178/18.11; 345/179

(58) Field of Classification Search ............. 178/18.11, 178/18.09, 19.05; 345/175–180, 166; 382/314
See application file for complete search history.

(56) References Cited

U.S. PATENT DOCUMENTS

| | | | | |
|---|---|---|---|---|
| 3,761,877 A * | 9/1973 | Fernald | ...................... | 382/315 |
| 4,565,947 A * | 1/1986 | Minn | ........................... | 313/467 |
| 4,656,947 A * | 4/1987 | Gordon et al. | .............. | 102/438 |
| 4,797,544 A | 1/1989 | Montgomery | | |
| 4,938,570 A * | 7/1990 | Majima et al. | ................. | 349/12 |
| 5,086,197 A * | 2/1992 | Liou | ........................ | 178/18.09 |
| 5,442,147 A * | 8/1995 | Burns et al. | ............... | 178/18.09 |
| 5,444,193 A * | 8/1995 | Satoh et al. | ............... | 178/19.05 |
| 5,502,514 A * | 3/1996 | Vogeley et al. | ............... | 348/771 |
| 5,578,813 A | 11/1996 | Allen et al. | | |
| 5,644,139 A | 7/1997 | Allen et al. | | |
| 5,771,039 A * | 6/1998 | Ditzik | ........................ | 345/178 |
| 6,097,376 A * | 8/2000 | Rothschild et al. | .......... | 345/180 |
| 6,208,771 B1 * | 3/2001 | Jared et al. | ................... | 382/306 |
| 6,281,882 B1 | 8/2001 | Gordon et al. | | |
| 6,377,249 B1 * | 4/2002 | Mumford | .................... | 345/179 |
| 6,433,780 B1 | 8/2002 | Gordon et al. | | |
| 6,963,059 B2 * | 11/2005 | Lauffenburger et al. | ..... | 250/205 |
| 2004/0135825 A1 * | 7/2004 | Brosnan | ..................... | 345/857 |

FOREIGN PATENT DOCUMENTS

| | | |
|---|---|---|
| EP | 0957448 | 11/1999 |
| EP | 1255219 | 11/2002 |
| WO | WO-01/61451 | 8/2001 |

* cited by examiner

*Primary Examiner*—Amr Awad
*Assistant Examiner*—Stephen G Sherman

(57) ABSTRACT

An apparatus for optical navigation. The apparatus has a surface comprising an aperture, wherein the surface is configured to be moveable against an illuminated surface having a detectable texture. An optical motion detection circuit is integral to the apparatus and optically coupled to the detectable texture of the display screen. The optical motion detection circuit produces motion signals indicative of motion of the surface relative to the detectable texture of the illuminated surface, wherein the optical motion detection circuit is operable to detect the detectable texture without requiring an integral illumination source.

18 Claims, 7 Drawing Sheets

402 Electron Beam
404 Shadow Mask
406 Funnel Glass
408 Frame
410 Phosphor Screen
412 Panel Glass

450
Backlight

APPARATUS FOR OPTICAL NAVIGATION

FIELD OF INVENTION

Various embodiments in accordance with the invention relate to the field of optical navigation.

BACKGROUND OF THE INVENTION

As computing technology continues to advance, computing devices with new form factors are introduced into the marketplace. These new form factors often provide users with new ways of computer-human interaction. For example, a large number of computing devices introduced in recent years have display screens that are also used for data entry. For example, personal digital assistants (PDAs) and tablet personal computers (PCs) typically have displays screens that function both as displays and as digitizers for receiving data.

Many existing screen input and navigation technologies are based on touch screen technology. A touch screen is a computer display screen that is sensitive to touch, for example, touching a stylus to the touch screen. In order to provide screen input and navigation functionality, touch screens are specially constructed screens. Current touch screen technology includes resistive, capacitive, and surface acoustic sensing touch screen panels. Specifically, touch screens may require special membranes, transparent conductive films, and large source and sensor arrays in addition to standard display manufacturing.

There are several drawbacks to requiring a touch screen for providing data input and navigation of a PDA or a tablet PC. Touch screens are typically expensive to manufacture, due to the sensitivity of the components. The cost of a touch screen increases dramatically as the size increases. Furthermore, current touch screen technology is typically only applied to build special displays and cannot readily retrofit existing monitors. Touch screens are also very sensitive to contamination during operation, which can lead to in costly repairs and to computer system downtime.

SUMMARY OF THE INVENTION

Various embodiments in accordance with the invention, an apparatus for optical navigation and data input on an illuminated surface, are described. By providing for optical navigation and data input, computer systems using display screens for navigation and data entry do not require the use of touch screen technology. Furthermore, by utilizing the illumination of a self-illuminated surface, it is not necessary to provide illumination from an internal light source within the electronic device. By not requiring an internal light source, electronic devices for optical navigation and data entry in embodiments in accordance with the invention are provided with significant power savings.

BRIEF DESCRIPTION OF THE DRAWINGS

The accompanying drawings, which are incorporated in and form a part of this specification, illustrate embodiments in accordance with the invention and, together with the description, serve to explain the principles of the invention.

DETAILED DESCRIPTION OF THE INVENTION

Various embodiments in accordance with the invention provide an electronic device for optical navigation and data entry on an illuminated surface. Accordingly, computer systems using display screens for navigation and data entry do not require the use of touch screen technology, which can be very expensive and require special manufacturing processes. Furthermore, by utilizing the illumination of a self-illuminated surface, it is not necessary to provide illumination from an internal light source of the electronic device. Illumination sources are typically a substantial power drain on wireless optical navigation devices. By not requiring an internal illumination source, electronic devices for optical navigation and data entry in embodiments in accordance with the invention are provided with significant power and cost savings.

For purposes of clarity in describing embodiments in accordance with the invention, the application starts with a discussion of the physical structure of an embodiment of an optical screen navigation device in accordance with the invention. This is followed by a description of the physical structure of exemplary illuminated surfaces upon which embodiments in accordance with the invention may be implemented. That discussion will then be followed by a description of the operation of the optical screen navigation device on an illuminated surface in an embodiment in accordance with the invention.

Figure 1A:
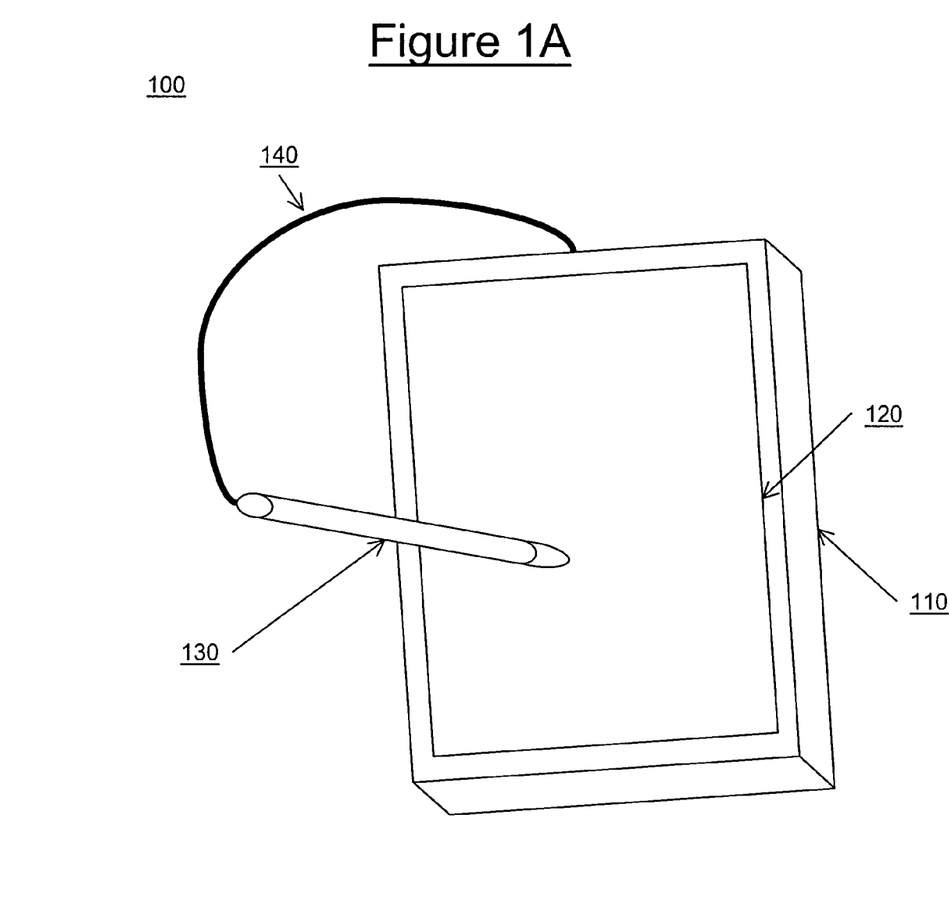
FIG. 1A illustrates an exemplary system for optical navigation on an illuminated surface of an embodiment in accordance with the invention.

Physical Structure of Optical Screen Navigation Device in Embodiments in Accordance with the Invention FIG. 1A illustrates an exemplary system 100 for optical navigation on an illuminated surface in one embodiment in accordance with the invention. System 100 comprises housing 110, display screen 120 and optical screen navigation device 130. It should be appreciated that embodiments in accordance with the invention are directed towards a using optical screen navigation device 130 in conjunction with display screen 120 to navigate and input data on a computer system. While optical screen navigation device 130 is shown having a form factor similar to a pen, it should be appreciated that optical screen navigation device 130 is not limited to a pen implementation, and may be implemented as having any form factor, such as a mouse.

In one embodiment in accordance with the invention, display screen 120 is an integral display screen of a computing device, such as a tablet personal computer (PC) or a personal digital assistant. In another embodiment in accordance with the invention, display screen 120 is an external display screen of communicatively coupled to a computing device, such as a desktop PC. Display screen 120 may be a liquid crystal display (LCD), a cathode ray tube (CRT), or any other illuminated surface for displaying data of a computer system.

While embodiments in accordance with the invention are directed towards using optical screen navigation device 130 in conjunction with display screen 120 to navigate and input data on a computer system, it should be understood that display screen 120 may be any illuminated surface. Optical screen navigation device 130 in conjunction with an illuminated display can be used to navigate and input data on a different display screen.

In one embodiment in accordance with the invention, optical screen navigation device 130 is coupled to display housing 110 by cable 140. Cable 140 may provide data transfer between optical screen navigation device 130 and a computer system (e.g., a tablet PC) residing within display housing 110. It should be appreciated that the shown embodiment is exemplary, and that optical screen navigation device 130 may be connection to a computer system by a wired (e.g., cable 140) or a wireless connection.

Figure 1B:
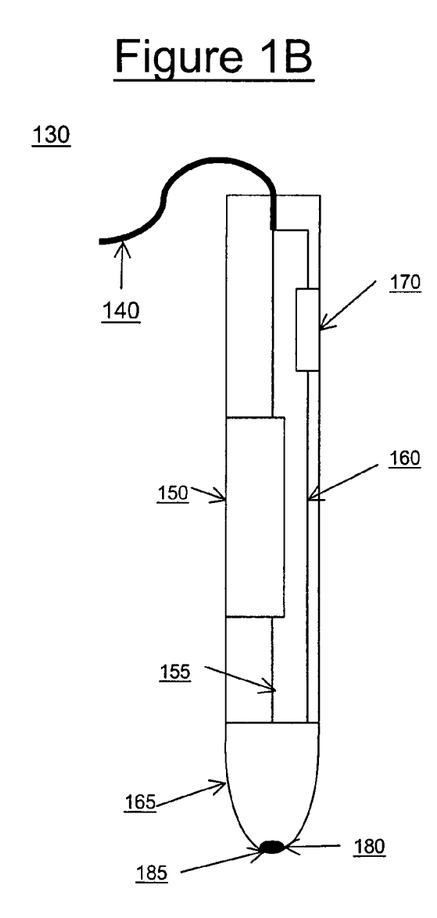
FIG. 1B illustrates an exemplary electronic device for optical navigation on an illuminated surface of an embodiment in accordance with the invention.

FIG. 1B illustrates an exemplary optical screen navigation device 130 for optical navigation on an illuminated surface in an embodiment in accordance with the invention. Optical screen navigation device comprises optical navigation componentry 165 for navigation and data input. In one embodiment in accordance with the invention, optical screen navigation device 130 comprises aperture 185 on surface 180 for providing optical navigation componentry 165 access to an illuminated surface.

In one embodiment in accordance with the invention, optical screen navigation device 130 is connected to a computer system over a wired connection using cable 140. Cable 140 may provide data communication and/or power to optical screen navigation device 130. Power is provided to optical navigation componentry 165 over power bus 155 and communication to and from optical navigation componentry 165 is supported over communication bus 160.

In another embodiment in accordance with the invention, optical screen navigation device 130 may comprise internal power source 150 and wireless transceiver 170 for communicating with a computer system. Power is provided to optical navigation componentry 165 over power bus 155 and communication to and from optical navigation componentry 165 is supported over communication bus 160. It should be appreciated that optical screen navigation device 130 may comprise any combination of internal or external power sources and wired or wireless data communication.

Figure 2A:
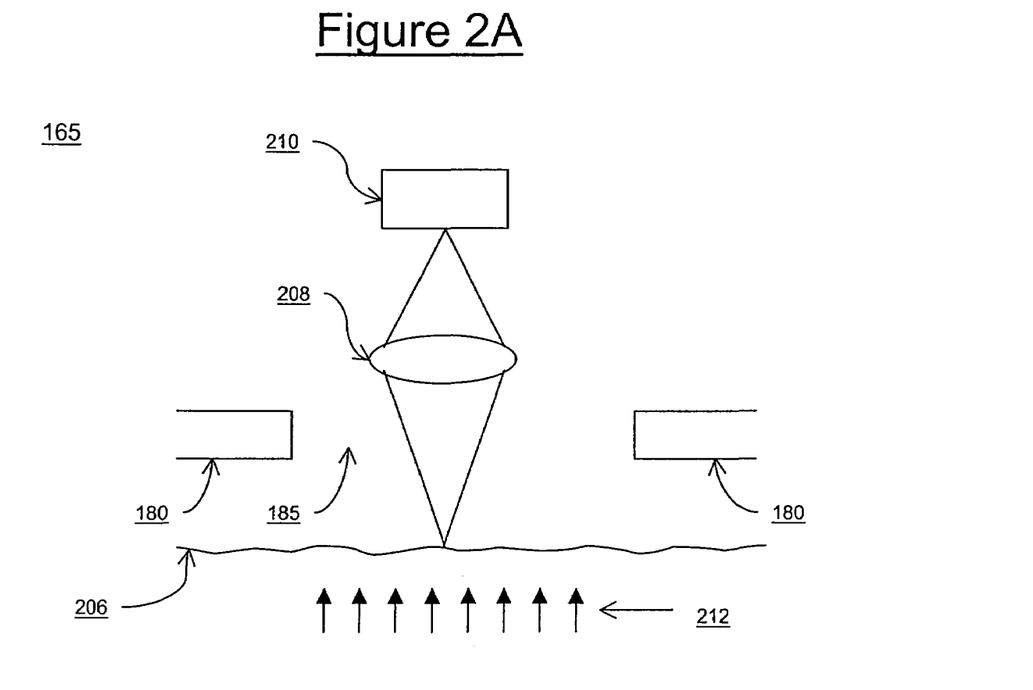
FIG. 2A is a block diagram of optical navigation componentry in an embodiment in accordance with the invention.

FIG. 2A is a block diagram of optical navigation componentry 165a in an embodiment in accordance with the invention. As described above, surface 180 comprises aperture 185 for providing optical access to self-illuminated surface 206. Although it has been omitted for clarity, the aperture 185 might include a window that is transparent for receiving light from self-illuminated surface 206, and which would serve to keep dust, dirt or other contamination out of the housing cavity of optical screen navigation device 130.

Optical navigation componentry 165a comprises optical motion detection circuit 210 and optical element 208. FIG. 3 is a diagram of an optical motion detection circuit 210 of an embodiment in accordance with the invention. Optical motion detection circuit 210 comprises detector 304 and image processor 306. Detector 304 is operable to capture an image of a surface (e.g., self-illuminated surface 206 of FIGS. 2A and 2B). It should be appreciated that detector 304 may be a charged coupled device, an amorphous photodiode array, or any other type of array detectors known in the art. Detector 304 captures images (e.g., image 302) at a specified rate, for example, two thousand images per second. Each image is forwarded to image processor 306, which is operable to determine positional information 310 based on the relative motion of each image. Positional information 310 may be transmitted to a computer system over a wired connection (e.g., cable 140 of FIGS. 1A and 1B) or a wireless connection (e.g., wireless transceiver 170 of FIG. 1B). Optionally, optical motion detection circuit 210 may comprise optical filter 308.

With reference to FIG. 2A, self-illuminated surface 206 is any surface that has texture and structures sufficient for performing motion sensing. Generally, any micro textured surface having features whose size falls within the range of 5 to 500 microns is adequate for use with optical screen navigation device 130. It should be appreciated that useful, high-contrast images of surface texture can be generated by detecting structural variations that are inherent to the surface or are formed on the surface. For example, images may be formed based upon the contrast between shadows in valleys and bright spots at the peaks of inherent structural features. Such features are typically microscopic in nature, often ranging between 10 µm and 40 µm in size on common printed media. As an alternative, speckle may be used, since specular reflection of a coherent beam produces a contrast pattern of bright and dark areas. A third source of contrast information is color. Color contrast is independent of surface texture. Even when illuminating the texture-free surface with light in the visible range, color contrast exists between regions of different colors, e.g., between different shades of gray.

Self-illuminated surface 206 receives illumination from illumination source 212. In one embodiment, self-illuminated surface 206 is a surface of a display screen. Since display screens can differ substantially in design and manufacture, there are a wide variety of surfaces that are satisfactory for use as self-illuminated surface 206. Some of the useful surfaces are described below at FIGS. 4A through 4C.

Figure 2B:
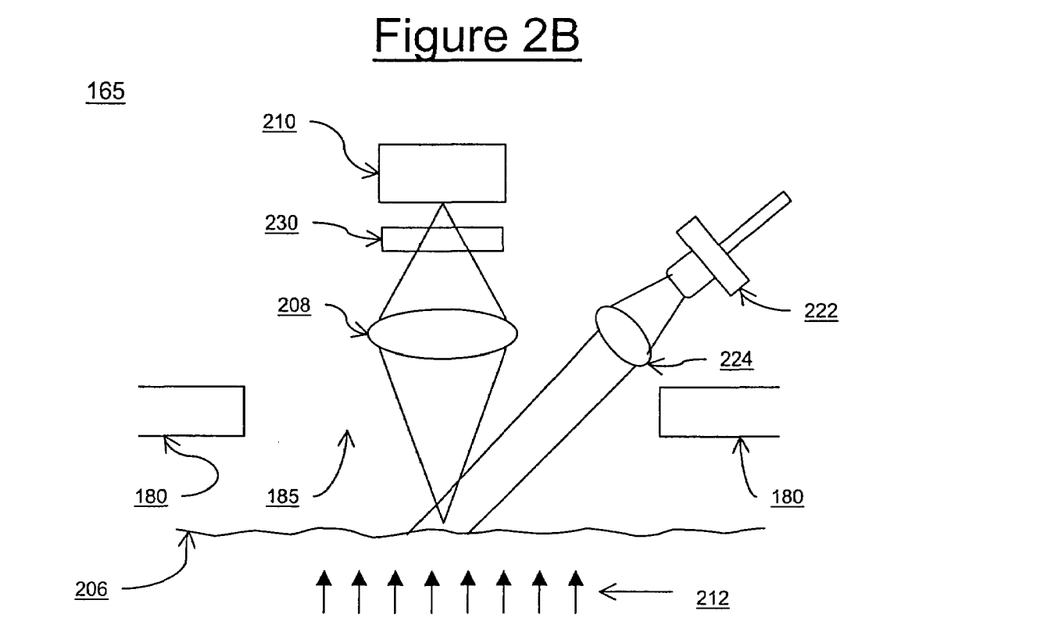
FIG. 2B is a block diagram of optical navigation componentry comprising an internal infrared (IR) illumination source in an embodiment in accordance with the invention
Figure 3:
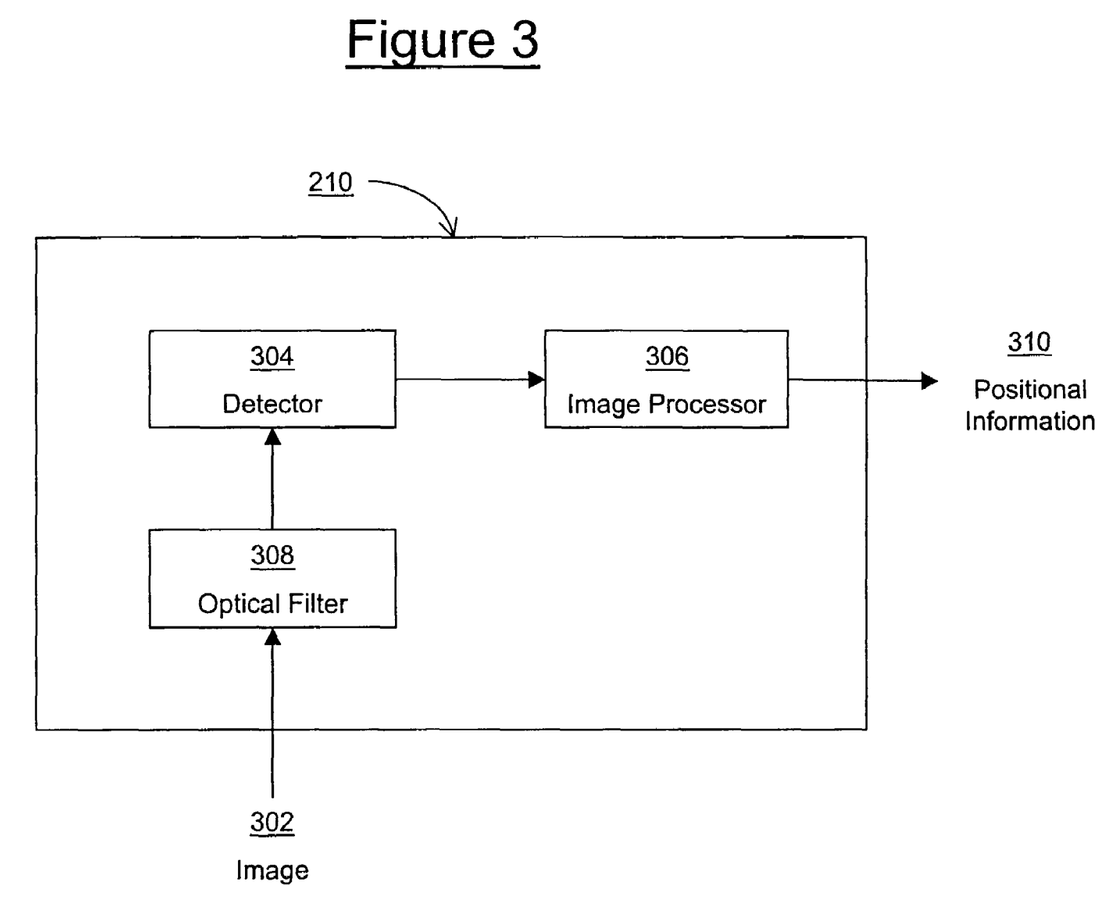
FIG. 3 is a diagram of an optical motion detection circuit of an embodiment in accordance with the invention.

FIG. 2B is a block diagram of optical navigation componentry 165b comprising a supplemental light source 222 in an embodiment in accordance with the invention. In one embodiment, optical navigation componentry comprises optical element 224 for focusing interference reducing illumination from interference reduction light source 22 over an area of self-illuminated surface 206. Optical navigation componentry 165b comprises the same components as optical navigation componentry 165a of FIG. 2A, in addition to supplemental light source 222. Optionally, optical navigation componentry 165b comprises optical filter 230.

In one embodiment in accordance with the invention, optical motion detection circuit 210 is operable to detect whether illumination at self-illuminated surface 206 is sufficient to capture an image. In some instances, the illumination of self-illuminated surface 206 may not be sufficient to allow optical screen navigation device 130 to capture an image. For example, the illumination may be to dim. The photo detectors can detect this condition and control additional components of optical navigation componentry 165b to compensate for the insufficient illumination. To account for insufficient illumination at self-illuminated surface 206, optical navigation componentry 165b utilizes supplemental light source 222 to provide additional illumination onto self-illuminated surface 206.

In another embodiment in accordance with the invention, optical motion detection circuit 210 is operable to detect interference at self-illuminated surface 206 caused by illumination source 212. In some instances, the illumination of self-illuminated surface 206 can interfere with the performance of optical screen navigation device 130. For example, the illumination may modulate at a frequency that disrupts the performance of optical motion detection circuit 210. The photo detectors can detect this disruption and control additional components of optical navigation componentry 165b to compensate for this interference.

To account for interference from illumination source 212, optical navigation componentry 165b utilizes supplemental light source 222 as an interference reduction light source in conjunction with an optical filter. In one embodiment, the optical filter is an optical filter element located within optical navigation componentry 165b (e.g., optical filter 230). In another embodiment, the optical filter is an optical filter element located within optical motion detection circuit 210 (e.g., optical filter 308). In another embodiment, the filtering functionality is implemented electronically within image processor 306 of FIG. 3. It should be appreciated that supplemental light source 222 can operate as an interference reduction light source while providing supplemental illumination where illumination on self-illuminated surface 206 is insufficient, as described above.

As described above, the illumination of self-illuminated surface 206 may have a detrimental effect on the performance of optical motion detection circuit 210. To reduce or eliminate interference caused by the illumination of self-illuminated surface 206, the optical filter can be used filter out light received at particular wavelengths or frequencies. In one embodiment, supplemental light source 222 is an infrared light source that emits light at a known frequency. The optical filter is operable to filter out the illumination received at the known frequency, and blocking the disruptive illumination from illumination source 212. By blocking out the interfering illumination and receiving only the infrared illumination, interference with optical motion detection circuit 210 can be eliminated. It should be appreciated that other combinations of interference reduction light sources and optical filters can be used to reduce interference. For example, if a display is monochrome (e.g., green), supplemental light source 222 can be a red light source, and the optical filter can be a red color filter to allow the red light from supplemental light source 222 to pass and block the light from the monochrome display.

In another embodiment, supplemental light source 222 may modulate in intensity at a different frequency than self-illuminated surface 212. Image processor 306 is operable to electronically filter out unwanted illumination and process the illumination from supplemental light source 222. The illumination from supplemental light source 222 modulates at a known frequency, and image processor 306 is locked to the known frequency, ignoring the illumination from self-illuminated surface 212.

Optical navigation componentry 165b of FIG. 2B also provides an electronic device for navigation and data input of a computer system without requiring a touch screen. Furthermore, embodiments in accordance with the invention are also useful where illumination from the display screen may cause interference with navigation and data input. Negating interference and providing additional illumination provide an increased range of applicability. Moreover, once the interference has subsided, the interference reduction light source can be turned off, providing the low power consumption mode as described at FIG. 2A. If the interference reduction light source is turned off, the optical filter may be moved or bypassed where it is an optical filter element (e.g., optical filter 230 of FIG. 2B or optical filter 308 of FIG. 3) or turned off if is implemented electronically in image processor 306.

Figure 4A:
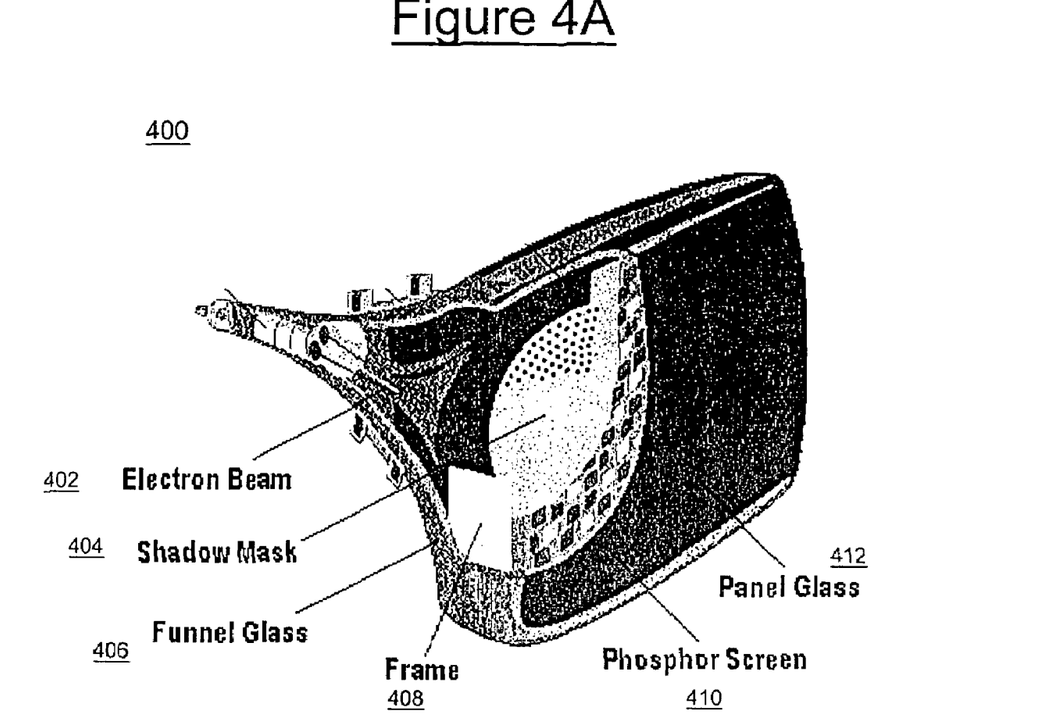
FIG. 4A is a diagram of an exemplary cathode ray tube (CRT) upon which an embodiment in accordance with the invention may be implemented.
Figure 4B:
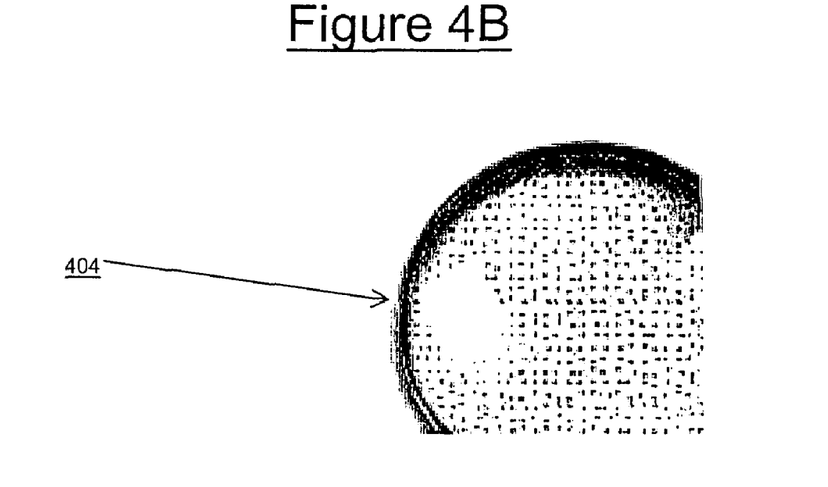
FIG. 4B is a diagram of an exemplary shadow mask of a CRT upon which an embodiment in accordance with the invention may be implemented.
Figure 4C:
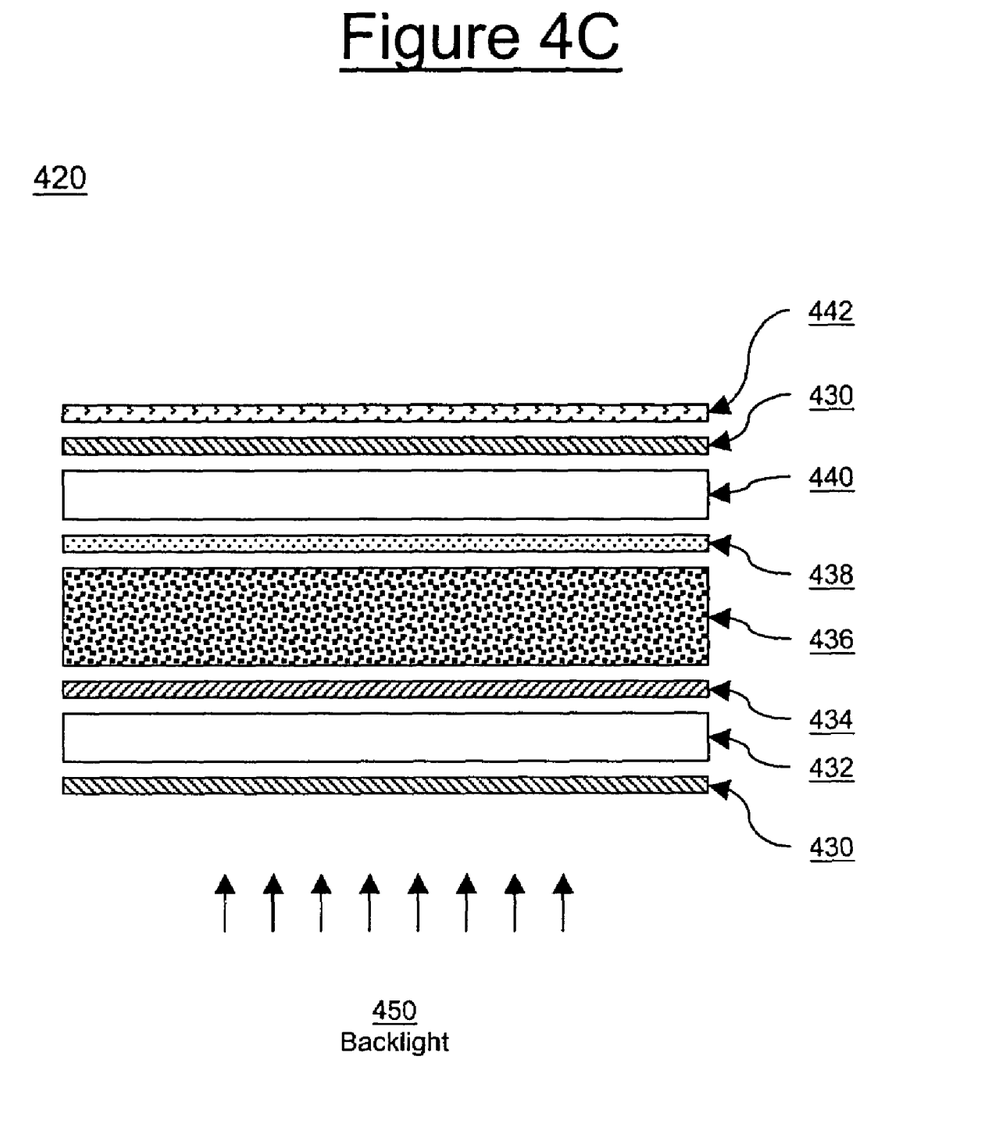
FIG. 4C is a diagram of an exemplary liquid crystal display (LCD) upon which an embodiment in accordance with the invention may be implemented.

Physical Structure of Exemplary Illuminated Surfaces Upon Which Embodiments in Accordance with the Invention May Be Implemented FIG. 4A through FIG. 4C illustrate exemplary illuminated surfaces upon which embodiments in accordance with the invention may be implemented. FIG. 4A is a diagram of an exemplary cathode ray tube (CRT) 400. CRT 400 comprises shadow mask 404, phosphor screen 410 and panel glass 412 within frame 408. Electron beam 402 travels through funnel glass 406 to illuminate shadow mask 404, phosphor screen 410 and panel glass 412. FIG. 4B illustrates a blow up of an exemplary shadow mask 404. Shadow mask 404 typically has a micro textured structure suitable for use as illuminated surface 206 of FIG. 2A.

FIG. 4C is a diagram of an exemplary liquid crystal display (LCD) 420 upon which an embodiment in accordance with the invention may be implemented. LCD 420 comprises polarizer layers 430, bottom glass layer 432, transistor matrix 434, liquid crystal suspension 436, electrode layer 438, and top glass layer 440. Backlight 450 provides illumination to LCD 420. Transistor matrix 434 comprises a transistor at each pixel, and has a micro textured structure suitable for use as illuminated surface 206 of FIG. 2A. Furthermore, LCD 420 may comprise diffuser or protection layer 442. Diffuser or protection layer 442 may be manufactured with sufficient micro textured structure suitable for use as self-illuminated surface 206 of FIG. 2A.

While FIG. 4A through FIG. 4C illustrate specific examples upon which embodiments in accordance with the invention may be practiced, it should be appreciated that any layer or component of a display screen with sufficient micro textured structure as described above is suitable for use as self-illuminated surface 206 of FIG. 2A. In one embodiment in accordance with the invention, self-illuminated surface 206 is overlaid with a semi-transparent layer that has a detectable texture. For example, diffuser or protection layer 442 of FIG. 4C may be a semi-transparent layer that is placed over LCD 420. As such, any surface with sufficient illumination can be used as self-illuminated surface 206 of FIG. 2A.

In one embodiment, the semi-transparent layer comprises unique positioning information providing absolute position information of the optical navigation device relative to the illuminated surface. The semi-transparent layer comprises a unique pattern such that an image taken by optical motion detection circuit 210 of FIG. 2A is operable to identify an absolute position on the illuminated surface.

Optical navigation componentry 165a of FIG. 2A provides an electronic device for navigation and data input of a computer system without requiring a touch screen. Furthermore, by eliminating the need for an internal light source, such as an LED, embodiments in accordance with the invention are useful where power consumption is an important concern, such as wireless devices with internal power sources.

Figure 5A:
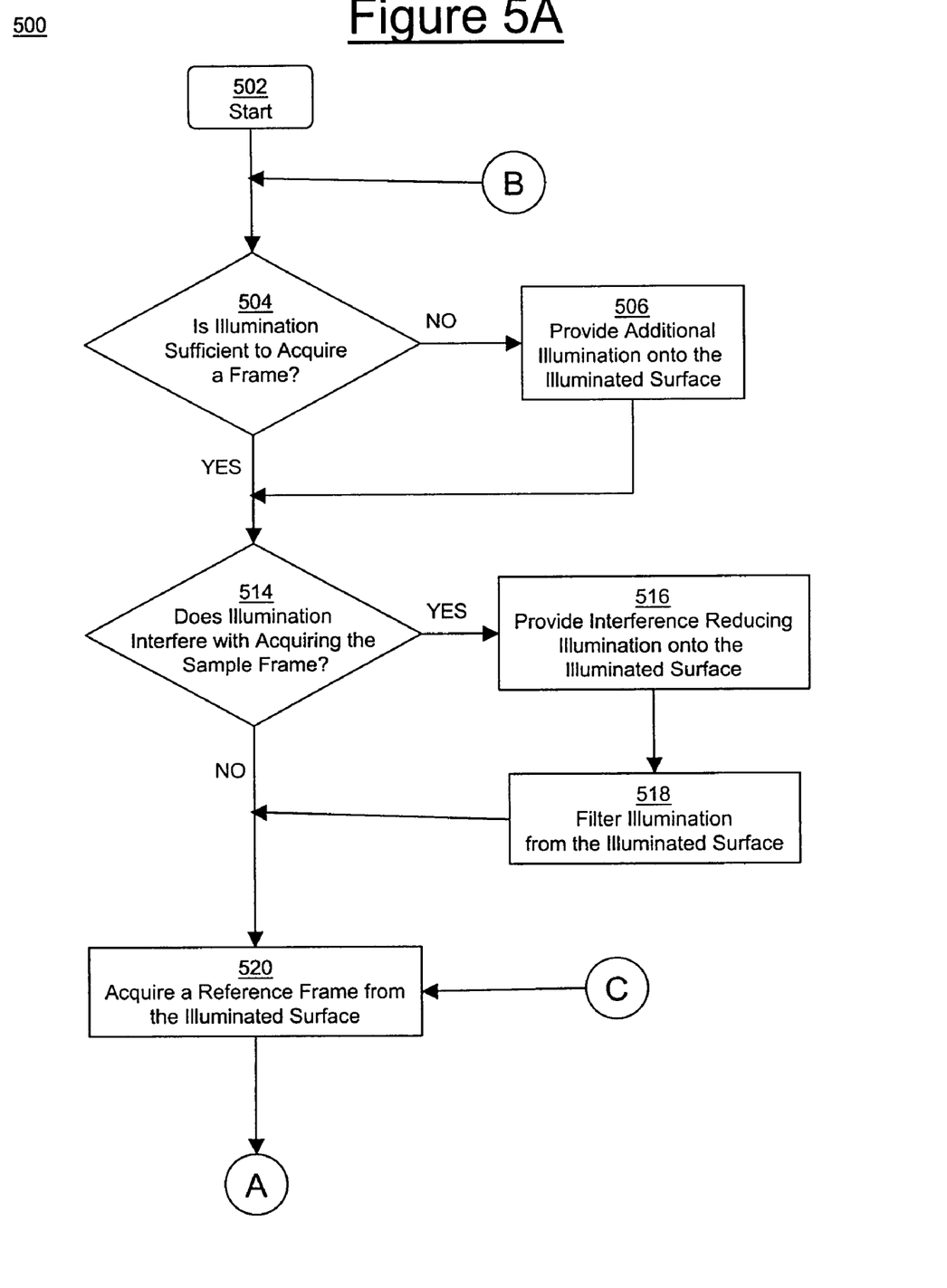
FIG. 5A and FIG. 5B are flow charts illustrating a process of optical navigation on an illuminated surface using an electronic device of an embodiment in accordance with the invention.
Figure 5B:
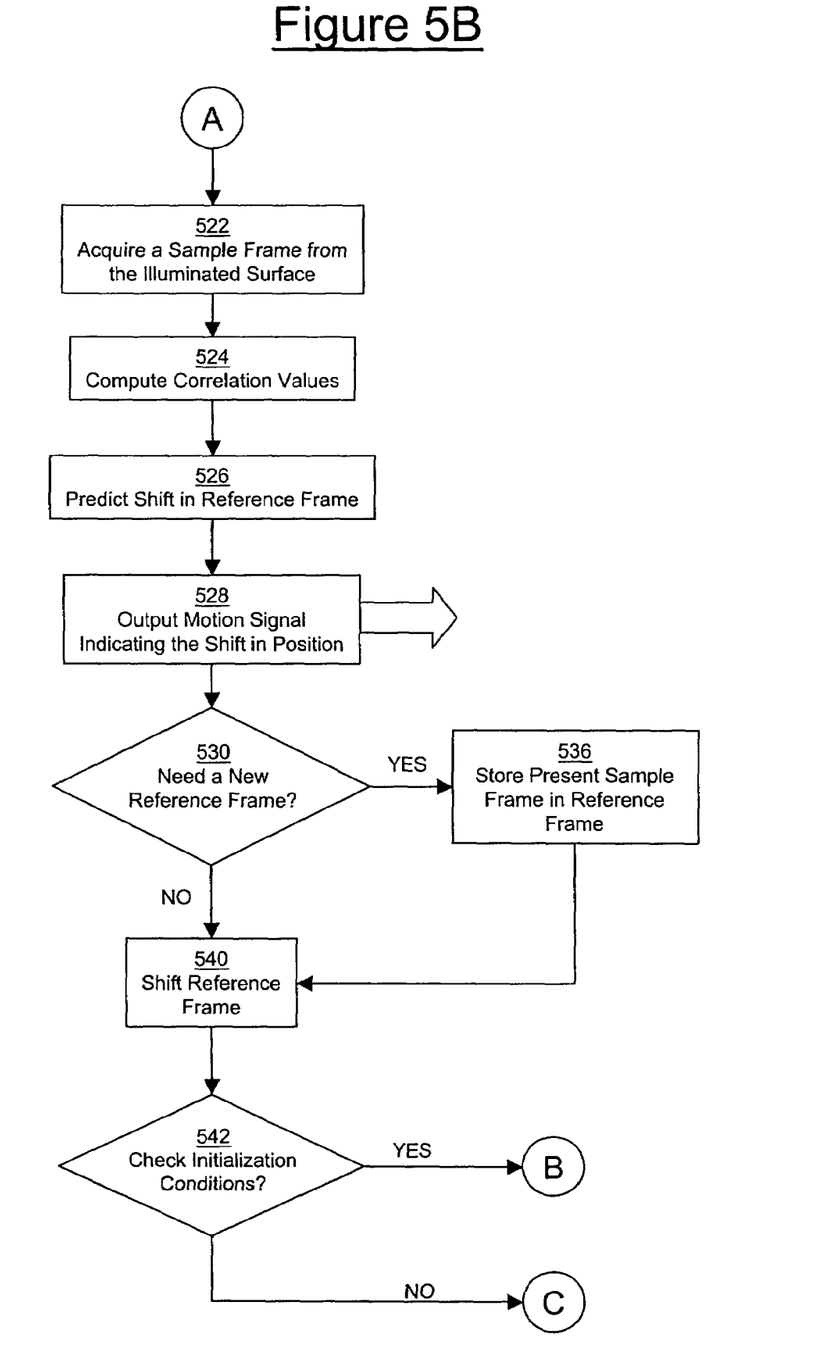

A Process of Optical Navigation on an Illuminated Surface Using an Electronic Device in Embodiments in Accordance with the Invention FIG. 5A and FIG. 5B illustrate a flow chart illustrating steps in a process 500 of optical navigation on an illuminated surface using an electronic device, in an embodiment in accordance with the invention. In one embodiment in accordance with the invention, process 500 is performed at optical navigation componentry of an electronic device (e.g., optical navigation componentry 165 of electronic device 130 of FIG. 1B) moving along an illuminated surface. Although specific blocks are disclosed in process 500, such blocks are exemplary. That is, the embodiments in accordance with the invention are well suited to performing various other blocks or variations of the blocks recited in FIG. 5.

At block 502 of process 500, a start condition is initiated. In an embodiment in accordance with the invention, an image of an illuminated region is detected at an image detector (e.g., detector 304 of FIG. 3). In one embodiment this is done with the aid of optical element 208 of FIG. 2A.

At block 504, it is determined whether illumination from the illuminated surface is sufficient to with acquire a frame. In one embodiment in accordance with the invention, a detector of an optical motion detection circuit (e.g., optical motion detection circuit 210 of FIG. 2B) is configured to determine whether illumination is sufficient to acquire a frame. Provided illumination from the illuminated surface is sufficient to acquire a frame, process 500 proceeds to block 514.

Alternatively, provided illumination is insufficient to acquire a frame, as shown at block 506, additional illumination is provided onto the illuminated surface by a supplemental light source light source (e.g., supplemental light source 222 of FIG. 2B).

At block 514, it is determined whether illumination from the illuminated surface is interfering with acquiring a frame. In one embodiment in accordance with the invention, a detector of an optical motion detection circuit (e.g., optical motion detection circuit 210 of FIG. 2B) is configured to determine whether illumination from the illuminated surface is interfering with acquiring a frame. Provided no interference is detected, process 500 proceeds to block 520.

Alternatively, provided interference is detected, as shown at block 516, interference reducing illumination is provided onto the illuminated surface by an interference reduction light source (e.g., supplemental light source 222 of FIG. 2B). At block 518, the illumination received from the illuminated surface, which now also comprises the interference reducing illumination, is filtered such that the optical motion detection circuit receives only the interference reducing illumination. It should be appreciated that the filtering may be performed by and optical filter element (e.g., optical filter 230 of FIG. 2B or optical filter 308 of FIG. 3) or may be performed electronically at the optical motion detection circuit.

At block 520, a reference frame from the illuminated surface is acquired. In one embodiment in accordance with the invention, a collection of digitized photo detector values is stored into an array of memory (not shown). As described above at FIG. 3, an optical motion detector circuit comprising a detector is operable to take an image of a portion of the illuminated surface, providing a reference frame.

At block 522, a sample frame from the illuminated surface is acquired. This refers to the same action as block 520, except that the data is stored in a different array of memory, and may reflect motion relative of the electronic device to where it was when block 520 was performed.

At block 524, correlation values are computed. In one embodiment in accordance with the invention, the nine (or perhaps twenty-five) correlation values are quickly computed by dedicated arithmetic hardware. At block 526, a shift in the reference frame is predicted. The predicted shift can be taken as the amount of movement corresponding to the correlation at the preceding block 524.

At block 528, a motion signal indicating the shift in position is output. In one embodiment in accordance with the invention, the motion signal comprises the change in location at the X-axis (e.g., $\Delta X$) and the change in location at the Y-axis (e.g., $\Delta Y$). The amount of motion since the last measurement cycle is noted here. The amount of shift needed to attain correlation is the desired amount. These values may be found by noticing which comparison frame actually correlated (assuming no interpolation). These "raw" $\Delta X$ and $\Delta Y$ motion values may be accumulated into running values that are sent to the computer system at a lower rate than that at which the raw values of block 528 are produced.

At block 530, it is determined whether a new reference frame is needed. Provided a new reference frame is not needed process 500 proceeds to block 540. Alternatively, provided a new reference frame is needed, as shown at block 536, the present sample frame is stored as the reference frame.

At block 540, the reference frame is shifted. The actual permanent shift of the values in the memory array representing the reference frame is performed. The shift is by the prediction amount, and data shifted away is lost.

At block 542, it is determined whether the initialization conditions determined at blocks 504 and 514 need to be checked. In one embodiment, the initialization conditions are checked for every frame. In another embodiment, the initialization conditions are checked after a predetermined number of frames has been captured. For example, after ten frames have been captured, the initialization conditions are checked. It should be appreciated that the initialization conditions can be checked at any time, and are not limited to the described embodiments. Provided it is determined that the initialization conditions need to be checked, process 500 returns to block 504. Alternatively, provided it is determined that the initialization conditions do not need to be checked, process 500 returns to block 520, where image capturing begins.

While the invention has been described in particular embodiments, it should be appreciated that the invention should not be construed as limited by such embodiments, but rather construed according to the below claims.

What is claimed is:

1. An apparatus for optical navigation comprising:
   a surface comprising an aperture, said surface configured to be moveable against an illuminated surface having a detectable texture;
   an optical motion detection circuit integral to said apparatus and optically coupled to said detectable texture of said illuminated surface, said optical motion detection circuit comprising a single detector for acquiring images of said illuminated surface at a specified rate, said detector acquiring a single image at a time, and comprising an image processor producing motion signals indicative of motion of said surface relative to said detectable texture of said illuminated surface, wherein said motion signals are produced by comparing two said images and comprise a change in location in a first axis and a change in location in a second axis, wherein said optical motion detection circuit is operable to detect said detectable texture without requiring an integral illumination source;
   an internal interference reduction light source integral to said apparatus and proximate said aperture, said interference reduction light source operable to provide interference reducing illumination onto said illuminated surface in response to said optical motion detection circuit detecting interference caused by an illumination from said illuminated surface; and
   an optical filter operable to filter said illumination and receive said interference reducing illumination such that said optical motion detection circuit can detect said detectable texture in the event of interference caused by said illumination.

2. The apparatus as recited in claim 1 further comprising an optical element integral to said apparatus, said optical element proximate said aperture and receiving light from said detectable texture of said illuminated surface, said optical element operable to optically couple said optical motion detection circuit integral to said detectable texture of said illuminated surface.

3. The apparatus as recited in claim 1 further comprising a supplemental light source operable to provide additional illumination onto said illuminated surface in response to said optical motion detection circuit detecting insufficient illumination of said illuminated surface.

4. The apparatus as recited in claim 1 further comprising an internal power source for providing power to said apparatus.

5. The apparatus as recited in claim 1 wherein said illuminated surface is a cathode ray tube and wherein said detectable texture is a shadow mask of said cathode ray tube.

6. The apparatus as recited in claim 1 wherein said illuminated surface is a liquid crystal display and wherein said detectable texture is a diffuser plate of said liquid crystal display.

7. The apparatus as recited in claim 1 wherein said illuminated surface is a liquid crystal display and wherein said detectable texture comprises pixels of said liquid crystal display.

8. The apparatus as recited in claim 1 wherein said illuminated surface is overlaid with a semi-transparent layer comprising said detectable texture.

9. The apparatus as recited in claim 8 wherein said semi-transparent layer comprises unique positioning information providing absolute position information of said apparatus relative to said illuminated surface.

10. An electronic device for optical navigation on a display screen, said electronic device comprising:
   a surface comprising an aperture, said surface configured to be moveable against a display screen having a detectable texture when illuminated;
   an optical element integral to said electronic device, said optical element proximate said aperture and receiving light from said detectable texture when illuminated;
   an optical motion detection circuit integral to said electronic device and optically coupled by said optical element to said detectable texture of said display screen, said optical motion detection circuit comprising a single detector for acquiring images of said display screen at a specified rate, said detector acquiring a single image at a time, and comprising an image processor producing motion signals indicative of motion of said surface relative to said detectable texture of said display screen when illuminated, wherein said motion signals are produced by comparing two said images and comprise a change in location in a first axis and a change in location in a second axis, wherein said optical motion detection circuit is operable to detect said detectable texture without requiring an integral illumination source;
   a supplemental light source integral to said electronic device and proximate said aperture, said supplemental light source operable to provide additional illumination onto said display screen in response to said optical motion detection circuit detecting insufficient illumination of said display screen and operable to provide interference reducing illumination onto said display screen in response to said optical motion detection circuit detecting interference caused by an illumination from said display screen; and
   an optical filter operable to filter said illumination and receive said interference reducing illumination such that said optical motion detection circuit can detect said detectable texture in the event of interference caused by said illumination.

11. The electronic device for optical navigation on a display screen as recited in claim 10 further comprising an integral power source for providing power to said electronic device.

12. The electronic device for optical navigation on a display screen as recited in claim 10 wherein said detectable texture is a shadow mask of a cathode ray tube.

13. The electronic device for optical navigation on a display screen as recited in claim 10 wherein said detectable texture is a diffuser plate of a liquid crystal display.

14. The electronic device for optical navigation on a display screen as recited in claim 10 wherein said detectable texture are pixels of a liquid crystal display.

15. The electronic device for optical navigation on a display screen as recited in claim 10 wherein said display screen is overlaid with a semi-transparent layer comprising said detectable texture.

16. The electronic device for optical navigation on a display screen as recited in claim 15 wherein said semi-transparent layer comprises unique positioning information providing absolute position information of said electronic device relative to said display screen.

17. A method for optical navigation on an illuminated surface using an electronic device, said method comprising:
   acquiring a first frame from said illuminated surface at a single detector of said electronic device, such that said electronic device does not require an internal illumination source to provide illumination to said illuminated surface;
   acquiring a second frame at said single detector from said illuminated surface;
   determining a change in position in a first axis and in a second axis of said electronic device relative to said illuminated surface based on said first frame and said second frame,
   wherein said determining a change in position comprises;
   computing correlation values for said first frame and said second frame, said correlation value indicating movement of said electronic device from said first frame to said second frame;
   predicting a shift in position from said first frame based on said correlation values; and
   outputting a motion signal indicating said shift in position, said method further comprising:
   determining whether illumination provided by said illuminated surface interferes with said acquiring said first frame;
   provided said illumination provided by said illuminated surface interferes with said acquiring said first frame, providing interference reducing illumination onto said illuminated surface; and
   filtering said illumination such that said electronic device can acquire said first frame using said interference reducing illumination.

18. A system for optical navigation comprising:
   a display screen including a self illuminated surface having a detectable texture; and
   an optical screen navigation device comprising:

a surface comprising an aperture, said surface configured to be moveable against said self-illuminated surface of said display screen;

an optical motion detection circuit configured to produce motion signals indicative of motion of said surface relative to said detectable texture of said self-illuminated surface, wherein said optical motion detection circuit is operable to detect said detectable texture without requiring an integral illumination source;

an internal interference reduction light source operable to provide interference reducing illumination onto said self-illuminated surface in response to said optical motion detection circuit detecting interference caused by an illumination from said self-illuminated surface; and an optical filter operable to filter said illumination and receive said interference reducing illumination such that said optical motion detection circuit can detect said detectable texture in the event of interference caused by said illumination.

* * * * *